Oct. 24, 1967 E. M. MILLER ETAL 3,348,786
SOUND TAPE CARTRIDGE
Filed March 24, 1964 3 Sheets-Sheet 1
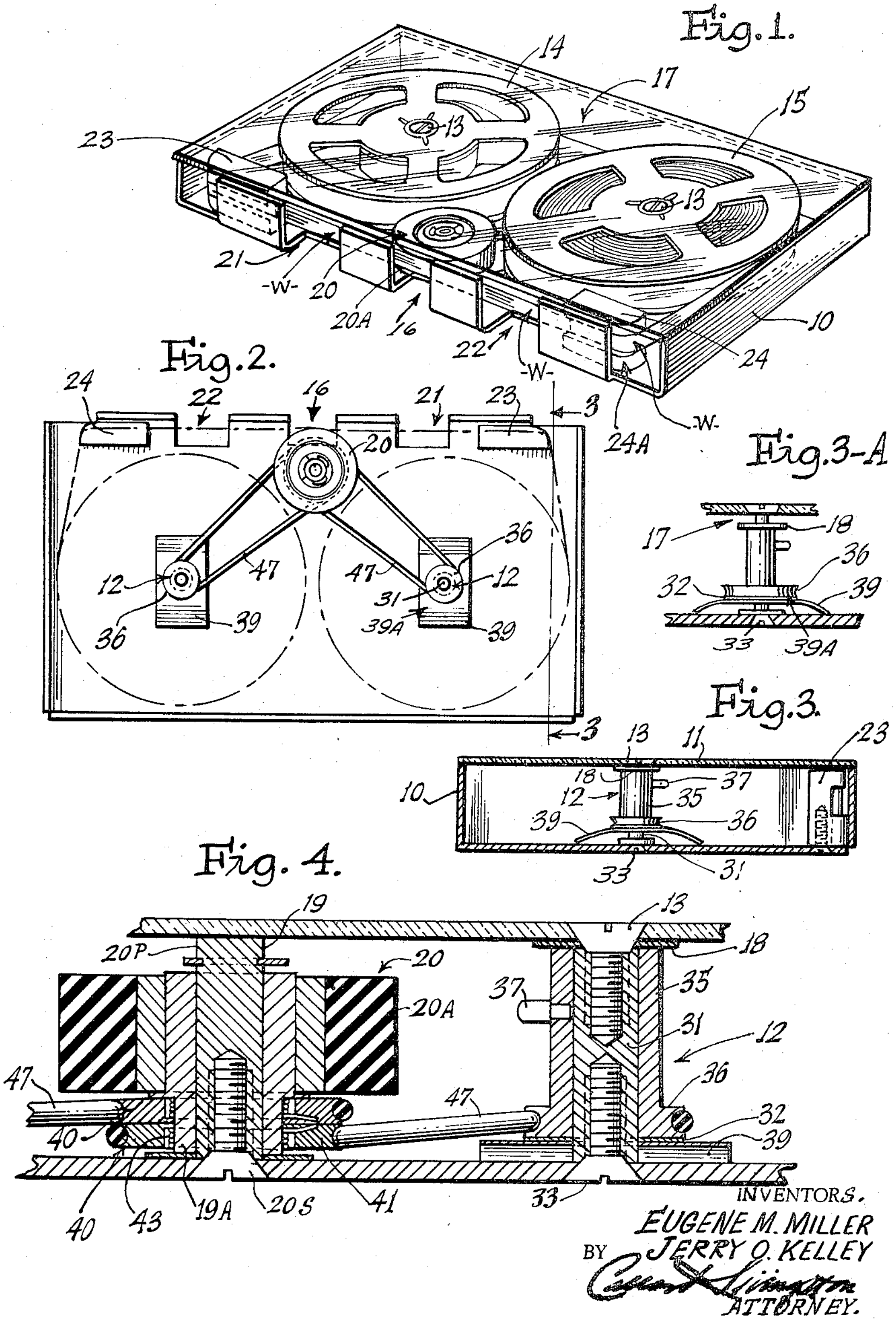
Fig. 1. Fig. 2. Fig. 3-A Fig. 3. Fig. 4.
INVENTORS.
EUGENE M. MILLER
JERRY O. KELLEY
BY [illegible]
ATTORNEY.

Oct. 24, 1967 E. M. MILLER ETAL 3,348,786

SOUND TAPE CARTRIDGE

Filed March 24, 1964 3 Sheets-Sheet 2

INVENTORS.
EUGENE M. MILLER
JERRY O. KELLEY

BY

ATTORNEY.

SOUND TAPE CARTRIDGE

Filed March 24, 1964 3 Sheets-Sheet 3

INVENTORS
EUGENE M. MILLER
JERRY O. KELLEY
BY
ATTORNEY.

United States Patent Office 3,348,786
Patented Oct. 24, 1967

3,348,786
SOUND TAPE CARTRIDGE

Eugene M. Miller, Crystal Lake, Ill., and Jerry O. Kelley, Lake Ozark, Mo., assignors, by direct and mesne assignments, to Cart-Trac, Inc., Chicago, Ill., a corporation of Illinois Filed Mar. 24, 1964, Ser. No. 354,477
25 Claims. (Cl. 242—55.13)

This application is a continuation-in-part of our application Ser. No. 227,880, filed Oct. 2, 1962, and now abandoned.

This invention relates to magnetic tape sound recording equipment and has as its principal object the provision of an improved message-repeating cartridge structure for sound tape characterized by the provision of reversible reel means operable to permit the tape to be reversely driven from reel to reel for continuous playing, and to be insertible into a sound unit in readiness for immediate operation.

The novel sound tape cartridge is further characterized by compactness and simplicity and the provision of a reverse-drive means in which the tape itself is adapted to be positively driven through a capstan drive means external to the cartridge and forming part of a sound transducing unit, and the advancing web of the tape is wound onto a take-up reel, which is driven from a pinch roller means necessarily moving in step with the tape, all in a manner and by a novel clutch means which automatically adjusts to the increasing effective diameter of the take-up reel as the turns of tape continue to be wound thereon, while the companion tape reel runs free in paying out the tape, such driving action being automatically reversible owing to the provision of a unitary and exceptionally compact reverse-acting dual clutching means contrived to form part of a capstan pinch or presser roller structure.

A further object is the provision of means providing a bed or seat for the cartridge with a snap-action locking means adapted to secure the cartridge in operative relation to a capstan spindle with the tape web exposed for immediate transducing coaction with one or more sound heads and reverse-control sensing means, the action of the locking means being automatically responsive to the pressure of the cartridge thereagainst on insertion into the bed or seat.

A further feature relates to the provision of a weight-responsive braking means cooperable with the reels and reel spindles within the cartridge for automatically loading and relieving the tape reels in proportion to the amount of tape carried thereby, so that fluctuations in the rate of advance of the tape resulting from momentum effects as the tape is transferred from one reel to the other are minimized.

Yet another feature of the disclosed cartridge structure resides in the simplicity of the cartridge casing and arrangement of tape windows in a wall thereof so as to expose a central run of the tape to the external capstan drive spindle as well as to a plurality of sound heads and a plurality of reversing-switch feeler contacts engageable with the tape to sense the approach of the ends thereof and control a motor-reversing means, all in a manner making the cartridge and the reel-driving means entirely self-contained in a ready-to-operate condition requiring nothing more than the insertion of the cartridge into its seat in the sound unit.

Still other features relate to the provision of yieldable coupling means for drivingly interconnecting the reels with their respective spindles, together with an automatic, reverse-acting, tensioning means optionally forming a part of the unitary pinch roller and clutch means of particular utility in maintaining a more uniform rate of effective tape travel where the higher quality of musical recordings are to be transduced.

Additional objects and aspects of novelty and utility will appear as the following description proceeds in view of the annexed drawings, in which:

FIGURE 1 is a perspective view of the novel sound tape cartridge;

FIGURE 2 is a top plan view of the same with the transparent cover and reels removed;

FIGURE 3 is a transverse section taken along lines 3—3 of FIGURE 2 with parts shown in elevation;

Figures 5, 6, 7:
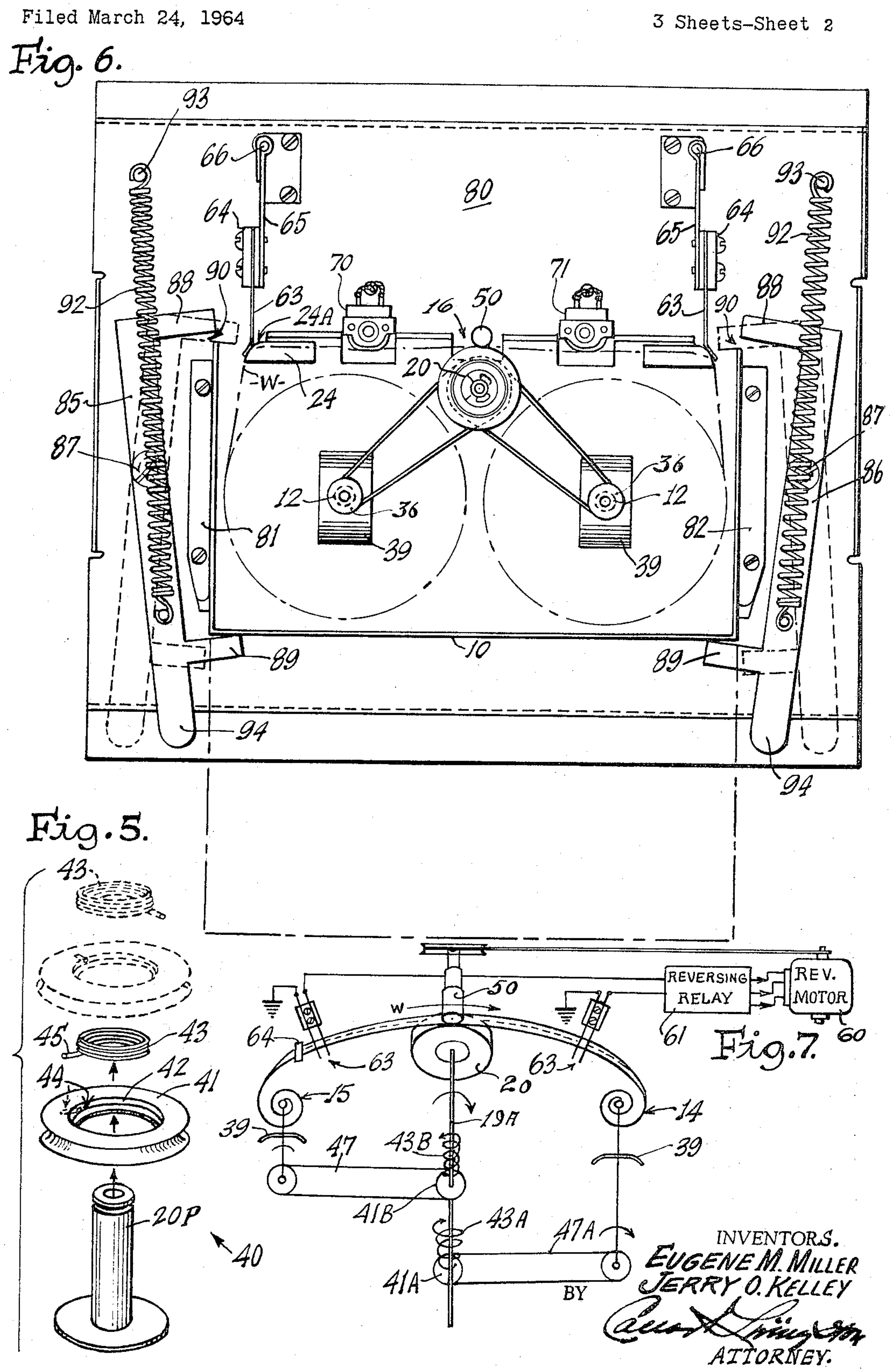
Figures 8, 8A, 9, 10, 11, 12:
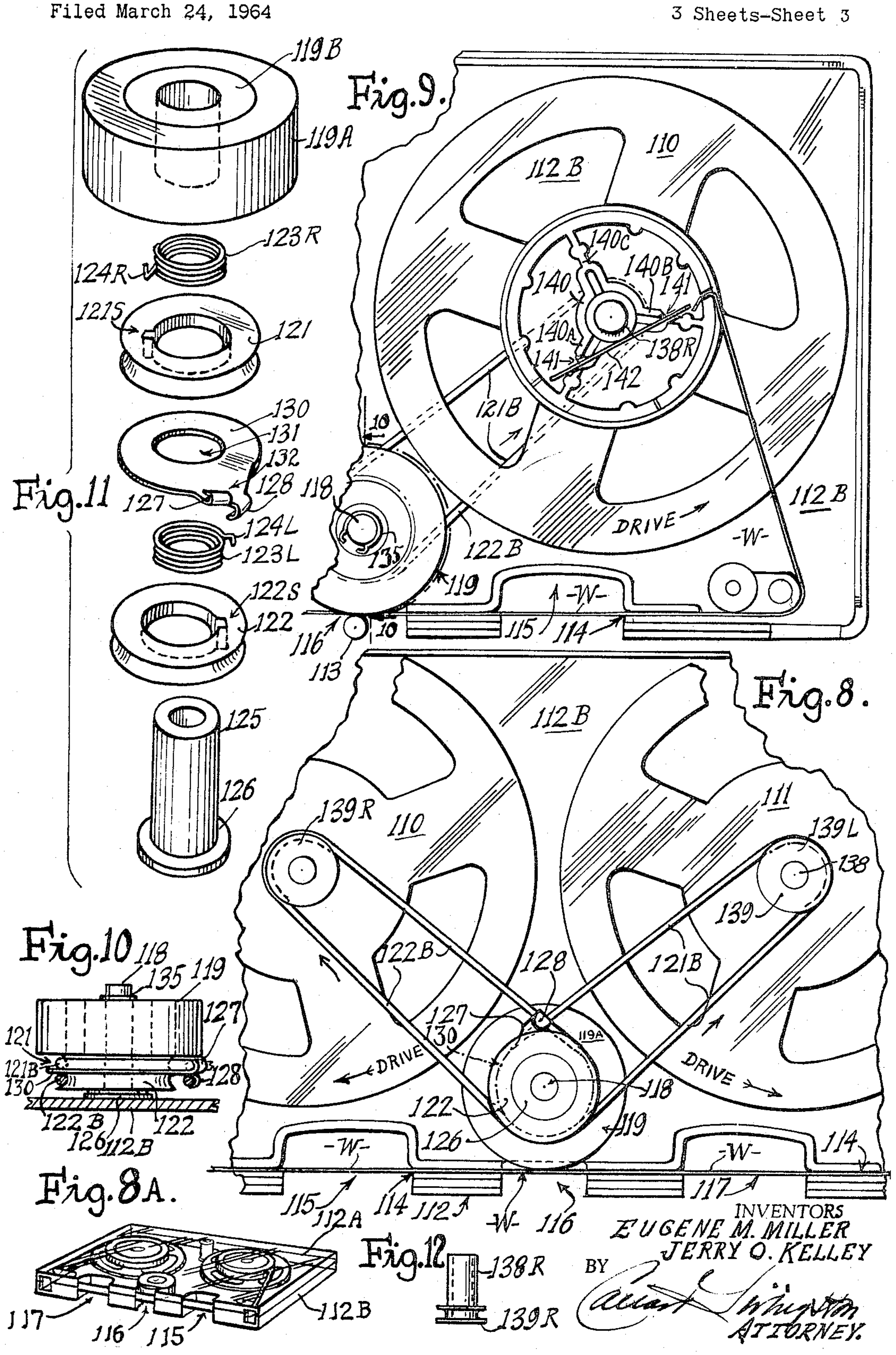

FIGURE 3–A is a fragment of the spindle structure of FIGURE 3 in lowered condition;

FIGURE 4 is an enlarged vertical sectional fragment taken through the reel driving means and capstan presser roller and one of the reel spindles;

FIGURE 5 is an exploded perspective to enlarged scale illustrating the parts and assembly of the reverse-drive clutch means;

FIGURE 6 is a top plan view to enlarged scale of a sound unit having sound heads and a tape cartridge bed adapted to cooperate with the novel cartridge;

FIGURE 7 is a functional diagram of the reversible reel driving means;

FIGURE 8 is a fragmentary bottom plan view of a modified cartridge including an automatic tensioning means;

FIGURE 8–A is a perspective of the cartridges seen in FIGURES 8 and 9, but to reduced scale;

FIGURE 9 is a fragmentary top plan view of a cartridge such as shown in FIGURE 8 with its cover removed;

FIGURE 10 is a side elevation of the combination pinch roll, clutch and automatic tensioning means with part of the cartridge floor shown in section;

FIGURE 11 is an exploded perspective of the combination pinch roll, clutch and tensioner unit shown in FIGURE 10;

FIGURE 12 is an elevational detail of one of the reel pulley spindles.

As viewed in FIGURE 1, the novel sound tape cartridge comprises a shallow rectangular case 10 preferably formed of a light-weight material such as aluminum and having an open top covered by a transparent cover plate 11 secured in position by means of a pair of screws 13 threaded into tapped bores in the posts for each of two reel spindles 12 respectively carrying one of two tape reels 14 and 15, the relative tape contents of which can be observed from time to time through the transparent cover.

The cartridge case is substantially closed except for a number of openings in one front wall thereof adapted to expose the travelling tape to the sound heads and certain sensing means for signalling the end of a run and reversing the driving direction of the capstan motor.

Behind a centermost one of the tape windows or openings 16, is a larger presser or backing roller 20 having a resilient peripheral rim 20A against and over which the tape web W travels, said central window being flanked by a pair of sound-head windows or openings 21 and 22 and past which the tape web W is also seen to pass in FIGURE 1 in moving from insulated guide blocks 23 and 24 at the opposite ends of the casing (see FIGURES 2 and 3 also) in passing from and to the reels, said guide blocks also serving as backers for the action of a pair of switch-feeler contacts 63, as in FIGURE 6.

As depicted in FIGURES 2, 3, and 4, each reel spindle consists of a post 31 having a bottom footing secured on the bottom of the casing by means of an anchoring screw 33 threading into a lower tapped bore in the post opposite the upper bore into which the appertaining cover-hold-down screw 13 is threaded.

Freely slideable up and down upon the post 31 is a reel spindle in the form of sleeve 35 having at its bottom an integral pulley 36, the upper reaches of the sleeve being provided with a small radial keying stud 37 adapted to fit into the driving keyway of a reel hub so that the reel will turn with the sleeve when the latter is driven by its pulley, as will more fully appear hereafter.

The sleeve portions of the reel spindles are of sufficiently short length to afford a clearance 17 (FIGURE 3–A) of about 3/32 inch beneath the cover plate and the top friction washer 18, so that the spindles can rise and fall in load-adjusting operations involving the action of a wide blade spring 39 having a flat central land 39A and a nylon washer underlying each spindle, and a selected tension such that when the reels are relatively free of tape and hence lighter in weight, the spindle is elevated to provide a braking action between the upper end thereof and the washer 18 and cover plate to prevent the light reel from overrunning and moving erratically owing to momentum effects, the blade spring 39 tending to flatten down and relieve this braking effect as the appertaining reel winds in a heavier load of tape. While it is possible to use other forms of braking spring, such as a fine helical spring, the blade spring gives a very consistent and satisfactory regulatory effect, particularly when the flat central land 39A is employed with the washer means 32 to provide a relatively constant frictional factor at the bottom of the spindle which serves also to suppress momentum effects in the heavily loaded reel while presenting a minimum of unnecessary loading itself owing to the presence of the nylon washer 32.

Thus the braking spring means 17, 18, 39, 39A provides an automatic self-adjusting means acting to provide a braking effect inversely proportional to the load of tape carried by the reels to suppress erratic reel movements due to momentum effects, the two reel spindle structures being identical in these respects.

The reel driving means is of great importance to the unique success of the cartridge, and comprises, in conjunction with the capstan presser or backing roller 20, a pair of reverse-acting clutches 40, each containing an internal helical clutch spring 43 (FIGURES 4, 5, 7) wound in a reverse sense relative to the spring of the other and closely embracing the reduced lower shank 19A of the roller shaft 19 which floats on a post 20P secured by screw means 20S in the floor of the casing.

The clutch pulley or sheave 41 seen in FIGURE 5 is counterbored to provide an internal ledge 42 as a seat or bottom for the appertaining helical clutch spring 43 (seated as in FIGURE 4), there being a small offset bore 44 adjacent this seat to receive and anchor the offset tail 45 of the spring in its seat whereby the spring is coupled to its sheave, the remaining end of each clutch spring blade being free and the spring helix acting to grab the shank 19A of the roller shaft when the latter is turning in one or the other direction of drive, the sense or pitch of the spring winding, whether clockwise or counterclockwise, determining which clutch will grab and which will slip.

The second or upper pulley clutch, shown in dotted lines in FIGURE 5, is identical to the companion or lower clutch except that its clutch spring will be wound oppositely from that of the companion clutch. The entire clutching spring means is contained within the marginal confines of the appertaining sheave or pulley which is contrived to be of wafer-like dimensions, thus making it possible to employ the twin clutches in an extremely small space beneath the presser roller 20, as in FIGURE 4, the view of which is drawn to considerably magnified scale over actual size.

From the foregoing description of the dual clutch structure, it will be understood that not only do the clutches drive or grab reversely depending upon the direction of rotation of the presser or idler roller 20, but they afford relief for tensions which arise from the change in loading and diameters of the two tape reels.

On the one hand, it is desirable to maintain an optimum tension on at least that part of the tape web which is passing over the sound head so as not to introduce variables which might affect the quality of the sound transduced; while, on the other hand, objectionable tensioning must not be permitted to build up as a result of changing reel diameters or speed differentials.

It will be appreciated that as the core of the take-up reel grows in effective diameter the pull thereby exerted on the incoming web of the tape increases. Because the driven reel is rotating at a substantially constant speed with the idler roller, any reaction in this reel tending to slow or stop it at the instant an increasing pull is sensed thereby, owing to growth in effective diameter, will have resultant effect of relaxing the clutching of the corresponding one of the clutch sheaves by which it is driven at such time, as a result of which the driving effect on this reel is momentarily relieved during a very brief interval in which the web of the tape continues to advance toward such reel so that the clutching action is instantly resumed.

Since there is some yield in the tape itself and some cushioning in the packing of the convolutions on the take-up reel, the latter appears to rotate at an almost constant speed, and the hesitation referred to is scarcely perceptible even at the slow tape speed of 3¾ inches per second.

One of the novel features of the cartridge and tape drive means is the fact that both the paying and take-up reels are in either direction of travel driven with the tape itself, rather than by any drive means coupled to the reels, as is the custom in prior arrangements, this action resulting from the arrangement seen in FIGURE 6 and the fact that when the cartridge is disposed in operative position on the sound unit in proper relation to the motor-driven capstan spindle 50, the tape web W is pressed between said spindle and the much larger resilient tire or rim of the roller 20, which causes the tape to be pulled in one or the other direction, depending upon the direction of rotation of the capstan spindle, with the result that the tape is pulled from one reel and payed toward the other, which at this time becomes the take-up reel, and it is this take-up reel which will at such time be positively driven through the appropriate one of the pulley clutches for the reasons heretofore explained, while the companion clutch means is adapted, by reason of its oppositely wound spring, to slip in response to any pull on the corresponding run of the tape tending to overrun the rate of the corresponding pulley drive, as a result of which dangerous stretching and pulling stresses on the tape web are substantially eliminated and the movement of the reels is coordinated with the rate of travel of the tape past the capstan drive, whereby wear and edge-fraying and speed-variation troubles commonly encountered with positive drive direct to the reel are eliminated, with consequently great increase in tape life and more uniform tape travel and better quality of reproduction.

The character of the improved driving action will be readily perceived from the schematic of FIGURE 7 in which the driving shank 19A of the presser roller, rotating clockwise in the direction of the full-line arrow as a result of rotation of the capstan spindle 50 against the tape and the roller 20, will cause one of the clutch springs 43A to grab, thus causing the corresponding clutch sheave 41A and reel pulley to rotate in like direction through the pulley belt 47A, so that the corresponding reel is positively driven in a direction to take up the tape in the direction of its advance by the capstan drive, while the companion clutch means 41B tends to slip in this same direction of tape travel, and the corresponding or pay-out reel is permitted to float freely on its spindle and rotate only in response to the withdrawal of the tape therefrom, any tendency of this pay-out reel to override the pull of the tape being automatically suppressed by the action of the appertaining blade spring brake means 39.

When the tape reaches the end of its run in one direction, the drive motor 60 will be automatically reversed as a result of action of a reversing relay means 61 under control of one of the sets of feeler switch contacts 63 in engaging a light metal tag 64 on the tape at the corresponding end region, in consequence of which the reversed drive of the capstan spindle will cause the reverse clutch action with a positive take up in the counter-clockwise driving action of roller spindle means 19, 20 and the reel 15 and clutch spring and pulley 41B, 43B.

The novel cartridge means is self-contained with respect to its drive means and is at all times in readiness for immediate recording or playback operation by the mere act of inserting the cartridge in a seat especially contrived for it in the sound unit shown in FIGURE 6, it being recalled that the tape web passes before the two sound head windows 21, 22, and past the drive window 16, past the presser and backing roller means 20, as a result of which mere placement of the cartridge in a predetermined position or seat relative to a pair of properly spaced sound heads 70, 71 located in confrontation to the positions of such windows, and to project in a direction slightly inwardly of the same so as to bear against the web of the tape at these two points, will cause the tape to ride over the usually arcuate face of such heads in sound transducing relationship with the latter.

In the unit of FIGURE 6 the cartridge-seating means is defined on the surface means 80 afforded by the top of said sound unit in an area between a pair of ribs or guide flanges 81, 82 spaced apart a distance to admit the length of the cartridge therebetween in an easy sliding motion with minimum play, nevertheless, so that sliding of the cartridge between these guide members 81, 82 accurately locates the casing and hence the windows 16, 21, 22 relative to the capstan spindle and the two sound heads with the tape pressing in operative engagement with the latter.

Means for automatically locking the cartridge in such operative position in the seating means comprises the provision of a pair of snap-acting locking and release levers 85 and 86 of identical shape and each pivoted between its ends, as at 87, on the units adjacent one of said guide members, and each having a pair of offset fingers 88 and 89 projecting from a side thereof toward a corresponding one of said guide members, said fingers on each lever being spaced lengthwise of the latter a distance to fit around the width of the cartridge casing with a predetermined small clearance 90 shown in the full-line position of said levers, in consequence of which, when the levers are in the opposite or dotted-line positions, the innermost fingers 88 thereof are in a position to be engaged by the leading side of the cartridge when the latter is slid inwardly of the seat between the guide members, the force exerted upon said inner fingers of the two levers in this inward or seating movement of the cartridge being such as to cause the levers to turn on their respective pivots 87 from their dotted-line positions to the full-line position, so that the outer fingers 89 are thrown into a blocking engagement (full lines) with the outer or trailing wall of the cartridge, thereby locking the cartridge in the seat.

The aforesaid action of the two levers 85, 86 is rendered automatically responsive and self-completing to pressure thereon by the cartridge owing to the provision of an over-center or snap-action spring means in the form of a long traction spring 92 for each lever, one end of each said spring being anchored on pin means 93 on the unit, and the opposite ends of these springs being attached to a pin on the appertaining lever situated beyond the pivotal axis thereof through the pivot screws 87, in a manner causing said spring to exert an over-center snap action to shift the same from one of said dotted- or full-line positions to the other when such lever is moved a predetermined amount by placement of the cartridge inwardly of the seat on the one hand, or when the cartridge is urged gently outward of the seat on the other hand, or when the levers are manipulated in the proper direction by engagement of the fingers with the finger extensions or handle means 94 provided at the respective outermost ends thereof.

Thus, merely inserting the cartridge into the seat with the levers in releasing condition (dotted lines) will trip the spring action of the levers and cause the latter to move the cartridge the remaining distance into the seat and lock the same sufficiently in position to prevent movement thereof from ordinary jarring and like disturbing causes.

As will be observed from FIGURE 6, the reversing feeler-switch contacts 63 are mounted by insulating means 64 carried by swinging arms 65 pivoted on posts 66, each provided with coil-spring means embracing a part of the post (not seen) to urge the corresponding carrier arm in a direction to thrust the feeler contacts lightly against the tape as it rides over the appertaining one of the guide blocks 23 or 24, it being observed that these blocks are rounded as at 24A (FIGURES 1, 6) to confront the offset gliding ends of the contact fingers so that the latter will positively engage the tape, without danger of injury thereto when the cartridge is thrust home in the seat, whether by automatic action of the over-center lever means or otherwise.

The message-repeating unit shown in FIGURE 6 may be made quite small and utilize a cartridge measuring little over 6" x 3" and have a thickness of as little as ¾" and house two reels of the 2½" size with dual sound tracks capable of affording .55 hour of vocal, instrumental or mixed recordings for advertising, instruction, or lecture purposes with interlude or background or continuous music, as the case may be.

Larger cartridges may also be employed, particularly for long-play musical recordings in magazine-type transducing equipment (not shown) in which the cartridges may be moved automatically into and out of operative relation to a capstan and sound head, either in succession or selectively, as in conjunction with equipment such as disclosed in a copending application Serial No. 309,974, such cartridges being preferably of the modified type shown in FIGURES 8 and 8–A herein, and measuring in one form somewhat over 4" x 8" with about the same thickness (¾") usual for the smaller cartridge, for example, the smaller cartridge of FIGURE 1.

For quality reproduction, particularly of instrumental music, it is important that the speed of the tape passing over the sound head be proper and as nearly constant as possible, and this requirement presents one of the difficult problems peculiar to the use of a recording medium such as magnetic tape, namely, that as the tape is pulled from one reel and wound upon the other, the diameters of the cores of tape on the two reels is constantly changing, so that the effective speeds of the outgoing and incoming portions of the tape web are constantly changing and become the source of a variety of obstacles to the development of a truly compact and economical reel-to-reel cartridge the size of which does not admit of any of the numerous expediencies usually proposed to overcome these problems, such as differential gearing, dual-reflex driving means and drive systems, change-ratio interdrive arrangements, slack-absorbing pulley drives, etc., many of which, regardless of expense or space considerations, are only theoretically workable because of the tendency of magnetic tape to pack its convolutions differently in winding onto the reel in any given operating cycle.

The disclosed reverse-acting dual clutch means coacting directly with the pinch roller spindle, contributes greatly to the maintenance of a constant take-up speed and travel of the tape past the sound head by exerting a constant but relaxable pull on the tape beyond the departure side of the head without positively driving the payout reel. However, it has been found that for best quality in reproduction, the slightest bunching or overrunning of the tape on the approach side of the head can affect the quality of the sound, and it is therefore advisable for highest fidelity to maintain a tension on the tape on the approach side of the transducing head.

The brake means 39 heretofore described serves to prevent free running or spin-out of the payout reel and at the same time adjusts its tension to minimize the loading effect in proportion to the weight of the reel and in this way also aids keeping some tension on the payout reel although this brake means should be sensitive and not present a constant or heavy drag on the pay-out reel for other reasons. And, if the maximum clutching sensitivity of the clutch means is to be maintained, particularly in the smaller embodiments of the combination clutch and pinch roller unit, some frictional grab between the spring and the pinch roller spindle will be inevitable and will therefore tend from time to time, especially with the smaller and lighter reels, to exert a slight and usually erratic driving effort on the pay-out reel which, because it is already being positively driven by the pull of the outgoing tape, may thus be sufficiently overdriven, despite a brake means like the weight-sensitive spring 39, to cause random variations in tension on the tape web moving onto the sound head, and a resultant disturbance of the quality and fidelity of the reproduction which, although possibly unnoticeable or unobjectionable in vocal and some classes of musical recording, could be objectionable for high-fidelity recordings, in which case the modified form of reel drive employed in the tape cartridge depicted in FIGURES 8 to 9 can be used, since it includes an effective means for automatically maintaining a slack-preventing tension on the payout web of the tape by means coacting with, and a part of, the combination pinch roller and clutch means heretofore described.

The bottom aspect of one of the modified reel-to-reel cartridges 112 is depicted in FIGURE 8, the cartridge casing being an elongated, flat packet having the configuration outlined in FIGURE 8–A and consisting of upper and lower mating sections 112A and 112B, respectively, preferably molded from clear plastic to expose the two tape reels 110 and 111 and the condition of the tape and its distribution between the two reels.

As viewed in FIGURES 8, the mating halves of the cartridge casing include registering groove or channel formations 114 defining an internal tape-feeding channel along one side of the casing, there being several recessed windows 115, 116, and 117 along the same side of the casing into which the tape channel communicates so that the web W of the tape travels across each window in its passage from one reel to the other, thereby exposing the tape for engagement with a driving capstan 113 at the central window 116 and to contact with a sound head at each of the flanking windows 115 and 117 as a result of pressing the cartridge toward these instrumentalities on a sound deck adapted to receive such cartridges, it being understood that two sound heads are commonly employed, one for each direction of travel to transduce one of the two oppositely-running sound channels respectively extending along the upper and lower portions of the tape.

Opposite the central window 116 and molded as a part of the bottom wall of the cartridge casing is a pinch-roll spindle 118 upon which is rotatably disposed the pinch roller 119 having a resilient rubber or like rim portion 119A the periphery of which is exposed through said window for engagement with the web of the tape passing thereacross and pressed against the motor-driven capstan spindle 113, exactly as described in view of FIGURES 6 and 7.

Means for positively driving each of the reels 110, 111 unidirectionally in a direction opposite from the other to serve as a take-up reel, comprises the compact combination pinch-roller, clutch, and automatic tensioning unit depicted particularly in FIGURES 10 and 11, FIGURE 10 also showing the pinch-roll spindle or post 118 which is preferably an integrally-molded part of the bottom section 112B of the cartridge case and located opposite the central window 116.

Beneath the pinch roller 119 are two driving sheaves or pulley wheels 121, 122 bored to fit freely upon a spindle sleeve which is press-fitted in the bore of the pinch roller substantially as heretofore described, and each of said drive sheaves or pulleys is drivingly connected by means of a pulley belt 121B or 122B with a driven reel pulley or sheave 139R or 139L respectively associated with one of the tape reels, as in FIGURE 8.

The reverse-driving and tension-regulating pinch roller means comprises the components seen in FIGURE 11, consisting of the resilient pinch roller 119A itself carried on a brass or like metal bushing 119B adapted to fit freely upon the nylon spindle bushing 125, said bushing having an integral flange 126 at its bottom serving as a footing and to space the lowermost pulley wheel from the bottom of the casing, as in FIGURE 10.

Fitting freely upon the pinch-roll spindle bushing 125 are the two floating sheaves or pulley wheels 121 and 122, the respective over-size bores of which fit over a corresponding helical clutch spring 123R or 123L, the former being set to grab in a clockwise or right-hand sense, and the latter in a counterclockwise or left-hand sense, the internal bore of each said spring being small enough to fit snugly upon the outside periphery of the nylon spindle post so as to grab the latter in sensitive clutching action when the corresponding spring is driven in the appropriate direction, each said spring having a free end portion 124R or 124L offset to lock in a small slot 121S or 122S in the appertaining pulley or sheave, as in the first-described embodiment, whereby torque applied to the spindle sleeve 125 in either direction of rotation will cause the clutch spring of the appropriate one of the sheaves to grab the sleeve and drive said sheave positively in the like direction, the companion sheave tending to slip on the sleeve 125 in the opposite direction since the latter sheave is being driven at this time in a direction opposite to that necessary to thrust the offset spring end in a direction against the spindle, in consequence of which the slipping clutch permits its sheave, and therefore the appertaining tape reel, to run substantially free as a payout reel.

The clutch springs may be reversely wound in clockwise and counterclockwise sense in order to grab in opposite directions; or, the same effect may be achieved by reversing one of two springs identically wound so that the respective offset end portions 124L, 124R thereof appear at opposite ends of the appertaining helix, the action being such that when either such end is pressed in a tendency to wrap or wind the spring convolutions further around the spindle, the spring will grab in clutch action, but when such ends are pressed in a direction tending to unwind the springs, the same will slip and run practically free and can be made to run wholly free if the spring helix fits loosely about the spindle, in which case, however, the clutch will tend to be less sensitive and will be relatively slow in grabbing, the presently-specified clutch springs accordingly being fitted quite snugly upon the spindle for instant clutching response.

The automatic tensioning means comprises a thin metal disc 130, which may be made of Phosphor bronze, for example, and has a central bore 131 slightly oversize so that, like the pulley wheels, it may turn freely about the spindle sleeve 125 in its condition of assembly with the latter disposed closely in between the two sheaves 121, 122 (as in FIGURE 10), said disc having a radial extension 132 which is provided with a pair of reverse-facing hook-like tangs 127 and 128, each turned back in a direction upwardly or downwardly upon itself oppositely from the other so as to provide shallow upper and lower belt-receiving cavities pitched respectively at an angle roughly tangential to the run of one of the pulley belts to fit against the same on the trailing side of the appertaining one of said sheaves so that the belt portions thus embraced thereby may run relatively free except for pressure applied by the tangs as a result of the torque acting upon the disc as a result of its tendency to be dragged around with the driven one of the sheaves.

The nylon spindle sleeve 125 is press-fitted into the bore of the brass or other bushing 119B in the pinch roller, and set home with just sufficient tightness to seize the two pulley wheels 121, 122 and the intervening tensioning disc 130 in a moderate frictional grip which will afford a tendency of the driven one of the pulleys or sheaves to drag the disc with it while allowing some possibility for the disc to slip relative to the companion sheave, said sheaves preferably being made of a material selected to have good wearing qualities and some frictional drag in combination with the material of the disc. For such purposes, pulley wheels molded from nylon have been found to give satisfactory results in combination with a tensioner disc made of a commercial grade of half-hard Phosphor bronze.

The entire combination pinch-roller, clutch and tensioner assembly is substantially as compact and small as the unit of FIGURE 4, and has the appearance depicted in FIGURE 10 when observed in elevation, and the appearance seen in FIGURE 8 when observed in plan from the bottom, and the appearance seen in FIGURE 9 when observed in plan from the top. The spindle post 118, which is preferably molded as an integral part of the bottom section of the cartridge casing, is of a diameter to fit freely in within the bore of the pinch roller bushing 119B, and is of a length to protrude sufficiently from the top of said bushing to be engageable with a spring horseshoe or like retaining washer 135, FIGURES 8 and 10.

A modified means for preventing either reel from spinning freely when operating as a payout reel and thereby relaxing or overrunning the tape and causing bunching, jamming, and tonal disturbances, is the provision of a novel slip-clutch means in both reels such as depicted in FIGURE 9 wherein it will be observed that the reel is provided with a hub portion 140 having radiating therefrom three spokes 140A, 140B, and 140C and such hub has wall portions cut away between the spokes 140A and 140B, thereby exposing the outer periphery of the spindle sleeve 138R of the appertaining reel spindle bushing, the form of which is seen in FIGURE 12, said bushings having an integrally formed sheave portion 139R which is adapted to be engaged by an appertaining one of the pulley belts 121B or 122B, as in FIGURE 8.

Each of the hub spokes 140A and 140B (FIGURE 9) is provided with a nearly chordal blade slot 141 flanking or adjoining said cut-away portion of the hub, said slots being adapted to seat a long blade spring 142, one side of which bears frictionally against the exposed peripheral parts of the appertaining spindle sleeve 138R or 138L with sufficient force to cause the reel carried upon such spindle sleeve normally to rotate in step therewith, but nevertheless under proper force differentials permitting relative slippage between such reel and spindle, and therefore permitting slippage relative to the corresponding reel pulley or sheave 139 should there be a substantial differential between the torque on such sheave and the pull on the tape web coming off the corresponding reel.

While dimensional considerations will obviously vary and must be empirically determined in accordance with the size of the cartridge and the reels, as well as the materials selected, the highly compact and self-contained character of the twin-reel cartridges disclosed is made possible by the correspondingly compact character of unitary pinch-roller and clutch unit, with or without the automatic tensioner, as disclosed, the small size of both forms of which may be appreciated, for example, by considering that in such cartridges the pinch roller itself may be of 1" diameter and about 5⁄16" thickness, and the spindle sleeve thereof may have an outside diameter of about 5⁄16," and the two small clutch springs embracing this spindle may consist of only four turns each of spring wire, such as music wire, of No. 1 gauge or about 0.010-inch diameter, the two pulley wheels fitting about these springs having an outside diameter of only about ⅝". The two clutch or drive sheaves or pulley wheels with the tensioner disc included therebetween may occupy a vertical distance between the bottom of the pinch roller and the floor of the cartridge case amounting to no more than approximately 3⁄16".

Thus, the entire pinch-roll drive unit, including the tensioning means, can require an over-all volume of as little as 1" x 1" x 9⁄16" or about 9⁄10 of a cubic inch, such dimensional considerations being given entirely by way of illustration to convey an idea of how small and compact the novel pinch-roll drive means may be, and not by way of limitation, it being possible to make the cartridges smaller or larger, as the desired usage may require, while retaining all of the advantages of compactness the invention affords.

In operation, the modified cartridge and pinch roller unit will be positioned by any suitable means to thrust the exposed web of tape riding over the pinch roller 119 against the usual motor-driven capstan (e.g. to capstan 50 of FIGURE 6) which will cause the tape to be travelled in one direction or the other depending upon the rotation of the capstan motor, with consequent rotation of the pinch roller in the like direction. As a result of the unidirectional clutching action of the appropriate one of the clutch springs, that one of the two drive pulleys or sheaves 121 or 122 which cooperates with that one of the two tape reels which must under these particular rotational conditions become the take-up or winding reel, will cause such reel to be positively driven in step with the pinch roller, as in the embodiment first described.

Under such conditions, the companion reel which pays out the tape will not be positively driven by the pinch roller means because the appertaining spring clutch will be normally slipping; however, this payout reel will nevertheless be positively rotated as a result of the pull on the tape unwinding therefrom; and unless some braking action or like restraint is applied to the payout reel, the latter may tend to spin or overrun as the result, for example, of such causes as the slight jerking advances upon the tape, or accelerations and momentums due to the constantly increasing (and frequently irregular or eccentric) size of the core of the tape being wound onto the take-up reel, with corresponding diminishing diameter of the unwinding core, such spinning or overrunning tendencies on the part of the payout reel being not only the cause of jamming of the tape in the capstan and the sound heads, but causing tonal variations of highly objectionable character as well.

The automatic tensioning means considerably alleviates troubles from the sources alluded to by constantly applying to the pulley belt of the payout reel only a restraining or tensioning force which is itself nevertheless yieldable and automatically relaxable in relation to the drag imparted to the tensioning disc 130 through the frictional drive of the latter with the driving one of the clutch pulleys at any given time.

Thus, considering FIGURE 8, for example, and assuming that the pinch roller 119 is being driven clockwise at the moment, the reel 110 will also be driven clockwise, and accordingly the tensioning disc will tend to turn clockwise and cause the belt-tang 127 to be thrust against its belt 121B which drives the other reel 111 through pulley 122, it being thus evident that the latter reel 111, which is at this time the payout reel, will be prevented from spinning because the corresponding reel spindle 138R will be coupled to the reel 111 thereon by the blade-spring "clutch" or coupling means 142 in the manner comparably depicted in FIGURE 9; and as a result of this drag pressure there is a tensioning effect upon the payout-reel pulley belt, and hence upon the web of tape being pulled onto the sound head, not shown but located opposite the windows 115 and 117 analogously to the arrangement in FIGURE 6. This applied tension nevertheless can be relaxed at the blade-spring clutch or coupling 142 should some sufficient counter-pull or resistance develop at the reel. Moreover, the tensioning disc means 130, 127, 128, is itself capable of relaxing its pressure or braking effect on the pulley belt and the payout reel in response to a counter-resistance from the payout reel sufficient to overcome the frictional drag between the tensioning disc and the flanking pair of clutch sheaves.

Thus, the novel tape-tensioning or reel-braking means 130, 127, 128, in combination both structurally and functionally with the reverse-acting, unidirectional clutch means and the pinch roller, affords a positive means for driving the take-up reel, and an automatic and sensitively-reacting means for holding the payout web of the tape under a self-adjusting tension preventive of overrunning, free spinning, relaxation, and snaking or run-out, the take-up side of the tape being likewise constantly but yieldingly under the positive and increasing pulling tension of the take-up reel, the effective growth in diameter of which continues during the entire take-up cycle.

The advantages of the novel pinch-roll drive means comprising the combination pinch-roller, dual reverse-acting clutches, and coacting tensioning disc assembled as a self-contained unit, may be availed of in modified form of construction and in conjunction with tape equipment which need not necessarily employ a cartridge, the unit being equally effective and useful for the open-reel type of sound equipment wherein the tape reels are mounted directly on some form of sound deck, so that no limitations in respect to size, form or functional specifications or arrangements are intended other than as may be required by the appended claims. However, it is considered that the compact, unitary character of the pinch roller and clutch unit makes possible the first wholly self-contained, truly flat reel-to-reel cartridge capable of use with an external capstan for reverse driving.

We claim:

1. In a sound tape cartridge, a pair of reel spindles each provided with a drive pulley; a capstan pinch roller having a shaft rotatable therewith; a pair of unidirectional clutch sheaves on said shaft and each effective to drive and slip in a direction opposite from the other; belt means drivingly interconnecting each of said clutch sheaves with one of said drive pulleys such that when the pinch roller is driven in either direction, one of the reel spindles will be positively driven in the same direction through a directionally corresponding one of said clutches while the remaining reel spindle will slip in this same direction, whereby a reel on the driven spindle will act as a take-up reel and a reel on the non-driven spindle will run free as a feed or payout reel.

2. A sound tape cartridge for use with a capstan drive spindle and comprising a casing adapted to seat a pair of tape reels; a pair of reel spindles journalled in said casing, a pinch roller journalled centrally along one side wall of the casing and in a triangular array relative to the reel spindles, said casing wall having an opening confronting said pinch roller and constituting a window adapted to expose the tape web passing over said roller to a capstan drive spindle; said wall having at least one additional window opening for exposing the tape web to a sound head; spaced tape guiding means closely adjacent said one casing wall near opposite ends thereof in positions on opposite sides of the pinch roller and respectively in adjacency to one of said reel spindles whereby the web of a run of sound tape unwinding from a reel on one of said spindles can be passed over the pinch roller and passed before all of said windows and thence onto another reel on the remaining one of said spindles; and reverse-drive unidirectional clutch and pulley-drive means coaxially mounted with and beneath said pinch roller and drivingly interconnecting said pinch roller with each of said reel spindles to drive one of the latter positively codirectionally with the rotation of the pinch roller in each direction of rotation of the latter in such manner that one of the reel spindles which is being positively driven acts as a take-up reel and turns in the same direction as the pinch roller while the remaining reel spindle runs free in the same direction so that the reel thereon can pay out freely.

3. Sound tape apparatus comprising a cartridge casing including a pair of tape reels rotatable therein, a tape presser roller means situated adjacent an open side-wall portion of the casing in a position with the periphery thereof and a web of tape thereon exposed to be engaged by the peripheral driving surfaces of an extrinsic capstan drive spindle on placement of the cartridge in operative juxtaposition therewith, means in the cartridge casing for guiding the tape web from one to the other of said reels over the periphery of said presser roller, said casing side wall having at least one opening adjacent said roller constituting a sound head window of a size to expose said tape web to engagement by a transducing device external to the cartridge and in predetermined alignment with a capstan drive spindle as aforesaid, and reversely-acting unidirectional drive means assembled coaxially with and actuated by said presser roller means dependently upon the direction of rotation thereof for positively driving one of said reels in the same given direction as that in which the presser roller means rotates but permitting said reel to slip free in the opposite direction, while the remaining one of said reels is not positively driven in the said given direction, said unidirectional drive means being operative to cause the relative driving and slipping and free actions of the reels aforesaid to be automatically reversed responsive to reversal of the direction of rotation of the presser roller means from said given direction.

4. Apparatus according to claim 3 further characterized in that said unidirectional drive means comprises a pair of wafer sheaves rotatable concentrically of a spindle rotatable with the presser roller and each said sheave includes within the marginal confines thereof a helical clutch spring having one end fixed with the sheave and the other end substantially free with the turns of the spring closely embracing the roller spindle to grab the latter in only one driving direction thereof, said springs being reversely wound so that each drivingly grabs the spindle in a direction of rotation of the latter opposite from that in which the other spring grabs; and belt means drivingly coupling each of said reel spindles with one of said clutch sheaves whereby one reel will always be driven by the presser roller means in the same direction as the latter while the remaining reel can run substantially free in such direction.

5. In a reel-to-reel reversible sound tape drive mechanism, first and second rotatable spindle means for seating and rotating a tape reel; capstan-driven pinch roller means over which a tape web paying out from one of said tape reels to the other is driven with said roller means in step with the advance of the tape; first and second unidirectional drive means cooperably driven in step with the roller means each in one of the two possible directions of rotation of the roller means, but respectively capable of automatically disengaging from driving coaction with the roller means in the other one of said two possible directions of rotation; means drivingly interconnecting the first and second spindle means respectively with the first and second unidirectional drive means whereby each of the latter will positively drive a different one of the spindle means in the same direction as the roller in each direction of rotation of the latter; and weight-sensitive brake means cooperably associated with each spindle means and operating automatically to apply a braking effort thereon in inverse proportion to the weight of tape on the corresponding reel.

6. A reversible sound-tape cartridge for reel-to-reel tape feeding, said cartridge comprising a casing having tape-exposure windows and containing a pair of reel spindles and tape guide means for directing travel of tape from one reel to the other on corresponding spindles past said windows; tape-feeding pinch roller means juxtaposed with one of said windows and over which the tape drives past the appertaining window for exposure through the latter to the driving effort of a tape drive capstan means extraneous to the cartridge; driven pulley means for driving each reel spindle; separate driving sheave and belt means for driving each said spindle pulley means, said driving sheave means being rotatable coaxially with said roller means; and regulatory drive means respectively forming a cooperative part contained within each said sheave means for driving the appertaining sheave means positively in only one direction codirectionally each with a different one of the two directions of rotation of the roller means, whereby one of the reels is always positively driven unidirectionally as a take-up reel only in the direction of rotation of said roller means in feeding tape toward that reel and cannot be positively driven in the opposite direction.

7. A snap-action locking mechanism for securing a rectangular sound tape cartridge in predetermined sealed condition in a bed therefor, said mechanism comprising a pair of levers carried on said bed in positions respectively opposite the respective end walls of said cartridge, said levers each being pivoted at a point between their ends and each provided with over-center snap-action spring means for pivoting the same into opposite positions; each lever having a pair of lateral projections spaced apart, one on each side of the pivot point along the length of the corresponding lever a distance to project into juxtaposition respectively with one of the side walls of said cartridge which adjoin said end walls, said levers being spaced one from the other a distance with respect to the length of the cartridge between said end walls such that on pushing the cartridge onto the bed into said seated condition with a predetermined one of said side walls facing foremost as the leading side of the cartridge when said levers are pivoted into a predetermined releasing position, said leading side wall of the cartridge will engage one of the projections on each lever and pivot both levers to and past over-center position with resultant snap-action pivoting of the levers by said spring means in a direction to thrust the respective remaining lever projections into blocking juxtaposition before the other and trailing side wall of the cartridge with the latter disposed and thereby secured in said seated condition.

8. In a reversible sound-tape reeling mechanism, a pair of reel spindles each adapted to be driven with a tape reel thereon by a sheave fixed therewith; a pinch roller positioned in the path of a web of tape being wound from one reel to another on said spindles to rotate in step with the tape travel; a shaft member rotatable in step and codirectionally with the pinch roller; a pair of clutch sheaves each provided with reversely-driving unidirectional slip cluch means, said clutch sheaves being mounted coaxially with said shaft member for reverse driving and slipping coaction therewith in opposite directions depending upon the direction of rotation of the shaft member and pinch roller; belt means drivingly intercoupling each of said clutch sheaves with one of said spindle sheaves, the reverse clutching action being such that one of said clutch sheaves is driven positively in only one direction which is opposite from that of the other and always codirectionally with the pinch roller, while the other spindle sheave not driven by the pinch roller runs substantially free in the same direction, whereby a tape reel carried by one or the other of said reel spindles will be positively driven as a take-up reel at effectively the same speed as the pinch roller with a tape reel on the remaining spindle at such time running substantially free as a payout reel, the clutch means of each clutch sheave having a unidirectional torque spring clutch of such sensitivity as to act to slip in sufficiently rapid intermittency responsive to efforts of that one of the reel spindles which is being driven thereby and which is acting as a takeup spindle and loaded with a take-up reel at such time to hestitate momentarily responsive to increases in tension on the take-up web of the tape as the wound-in core thereof increases in diameter, such intermittent slippage serving to prevent such tension from exceeding a predetermined safe magnitude to avoid injury to the tape from over-pulling or stretching and impairment of sound transduction, as the amount and diameter of tape wound onto the take-up reel increases up to the capacity thereof.

9. A sound tape cartridge in the form of a casing which is very flat in respect to its remaining dimensions, means for rotatively seating a pair of tape reels within said casing for reversely winding tape from one to the other thereof; a pinch roller rotatively mounted within said casing and having a peripheral portion exposed through a side of the casing for engagement with a driving capstan, the web of tape passing from one of said reels to the other being trained over the exposed peripheral portions of the pinch roller for engagement with said capstan whereby to pull the tape from one reel serving as the payout reel, in movement toward the other reel serving as the take-up reel; a pair of pulley drive wheels rotatable concentrically with said pinch roller, one-way clutch means for each said pulley drive wheel and respectively driving with the pinch roller in a direction opposite from the driving direction of the other drive wheel; means drivingly interconnecting each said drive wheel with one of said tape reels; said pinch roller and said pair of pulley drive wheels comprising a cooperative unitary assembly.

10. In a sound tape pinch roller mechanism, in combination: a capstan-driven pinch roller, a spindle rotatable therewith, a pair of thin pulley wheels floating about said spindle in close contiguity one with respect to the other; a one-way clutch spring confined within the body of each pulley wheel coaxially of said spindle and each operable to grab with the spindle in a direction opposite from the grab of the other, whereby each pulley wheel will be positively driven with the pinch roller in only one direction which is opposite from the driven direction of the other pulley wheel, each said pulley wheel being adapted to drive a separate pulley belt for one of two tape reels for winding tape from one to the other thereof; with the web of tape caught between said pinch roller and a conventional driving capstan; and automatic tensioning means comprising a disc-like drag member floating about said spindle in between said pulley wheels in frictional contact with both of the latter so as to be dragged codirectionally with the positively driven one of the pulley wheels sufficiently to develop a torque in said drag member, said drag member having radially-offset belt-engaging parts each situated in a position to bear against a run of one of said pulley belts to exert a force thereagainst in the direction of the turning moment of said drag member responsive to the torque imparted thereto when the pinch roller rotates in one or the other direction, said belt-engaging parts being so disposed in relation to said pulley wheels and the appertaining belts so that said force will be applied to that one of the belts which is associated with that one of said reels which is not positively driven at a given time but which is running free as a payout reel, whereby to maintain that portion of the tape web which runs from the payout reel to the pinch roller under positive but yieldable tension.

11. In a pinch roller mechanism for travelling tape, the combination with a pair of pulley-belt wheels and associated belts reversely-driven by positive one-way clutch action on a spindle coaxially assembled and driven with a pinch roller, of: automatic tensioning means in the form of a drag member floating about said spindle and situated in between said pulley wheels in frictional contact with each of the same with a tendency to be dragged around with the positively driven one thereof, said drag member having belt-engaging parts respectively situated in a position to bear against one of said pulley belts, said belt-engaging parts each being so disposed in relation to one of said belts as to apply a tensioning pressure responsive to drag action of the drag member to that one of the belts which is associated with that one of the pulley wheels which is not being positively clutch-driven in a given direction of rotation of the pinch roller, so that whichever pulley belt is positively driven at any time will be free of said tensioning pressure while the companion belt which is not positively driven will have said tensioning pressure applied thereto.

12. In a sound tape cartridge of the reel-to-reel type utilizing a pinch roller capstan-driven for travelling tape from one reel to another; a pinch roller assembly with built-in means for automatically tensioning that one of said reels which is the payout reel in any given direction of rotation of the pinch roller, and reverse-acting clutch means for positively driving that one of the reels which is the take-up reel in any given direction of rotation of the pinch roller; said assembly comprising a spindle driven by the pinch roller, a pair of pulley wheels floating about said spindle, clutch means wholly contained within the body of each pulley wheel and operative respectively to drive positively with said spindle and the appertaining pulley wheel in a direction opposite from the drive of the other pulley wheel; a tension member part of said assembly engaging each pulley wheel frictionally with a tendency to drag around with that one of the pulley wheels which is positively driven; a sheave and an associated tape reel driven thereby also located within the confines of said cartridge; belt means drivingly coupling each pulley wheel with one of said sheaves whereby the positively clutch-driven one of the pulley wheels will positively drive the associated reel with which it is belt-coupled to operate as a take-up reel while the companion reel runs free as a payout reel owing to one-way action of the associated clutch means; and means moved by said tension member, responsive to drag effort thereof and angularly disposed to engage in a braking action with the belt means of that one of the reels which is the payout reel in any given direction of rotation of the pinch roller whereby said payout reel is restrained against running free to maintain the tape web payed out thereby under tension.

13. Sound tape apparatus according to claim 12 further characterized in that each said reel is provided with hub means and a frictional slip clutch means in the form of a chordally-extensive blade spring cooperable therewith and yieldingly coupling the same with the appertaining one of said sheaves, whereby that one of the reels which is operating as a payout reel may yield relative to its sheave responsive to differential pulls between the payout web and the appertaining belt means.

14. In tape feeding apparatus including a pair of reels for reverse operation as payout and take-up reels, tape drive means comprising a pinch-roller disposed to be traversed by the tape in travelling from one of said reels to the other; a spindle for the pinch roller; a pair of pulley-belt sheaves each provided with clutch means coupling the same in a one-way drive with said spindle which is opposite from the direction of drive of the other sheave, each sheave running substantially free on said spindle in a direction opposite to its coupled one-way direction of drive; a driven pulley means for each reel and pulley belt means coupling each drive sheave with pulley means of one of said reels; and automatic tensioning means for applying a tensioning force to that one of the pulley belts to the reel which is running as a payout reel in either direction of rotation of the pinch roller, said tensioning means comprising a disc floating about said spindle in a position in between said drive sheaves in touching proximity therewith so that torque is transmitted thereto by the positively driven one of said driven sheaves when the pinch roller is driven, said disc having separate offset finger portions each angularly related to one of said pulley belts to bear thereagainst, respectively, when the disc is urged by said torque, the fingers being so disposed as to bear against the pulley belt for the reel which is running free as a payout reel whereby to maintain a restraining tension thereon sufficient to keep the payout portion of the tape web taut at all times.

15. In a sound tape device, a pair of tape winding reels; a pinch roller adapted for driving cooperation to press the web of tape winding between said reels against a driving capstan spindle to rotate the pinch roller and travel the web so as to transfer the tape from one of said reels constituting a payout reel onto the other constituting a take-up reel, and so reversely; a spindle portion rotatable with said pinch roller; a pair of drive sheaves freely fitting upon said spindle portion; sheave means respectively drivingly interconnecting with each reel; a pulley belt for each reel and respectively trained over one of said drive sheaves and one of said reel sheaves; reverse-acting one-way clutch means for each drive sheave each respectively coupling one of the latter sheaves with the pinch roller spindle portion, whereby to drive one of said reel sheaves, each said clutch means running free in a direction opposite from the free run of the other and driving in the opposite direction of its free run; and reverse-acting tensioning means comprising a torque member mounted coaxially with, and in between, said drive sheaves on said pinch roller spindle to be frictionally engaged by said drive sheaves and develop a torque through drag acting in the direction of one-way drive of either of said drive sheaves, and means on said torque member engaging the pulley belts of said drive sheaves to impart a tensioning force resulting from said torque only to that one of the pulley belts which is not being positively driven by one-way clutch action when the pinch roller is being rotated in tape travelling action.

16. For sound tape apparatus, a combination pinch roller, reversible clutch and tensioning means of unitary character comprising a pinch roller having a spindle rotatable therewith, a pair of reversely-grabbing clutch springs on said spindle, a pair of drive sheaves floating on said spindle and each cooperable with one of said clutch springs to be driven positively thereby with the pinch roller in a direction opposite from the direction of the drive of the other, and each adapted to slip in the direction opposite from its driven direction, and a tensioning device comprising a wafer-like member also floating about said spindle in a location closely in between and in touching proximity with said sheaves for frictional engagement with each of the same sufficient to exert a drag on the member producing a torque effort therein acting in the same angular direction as the direction of rotation of the driven one of said sheaves, said wafer-like member having a pair of tension elements each disposed for engagement with a pulley belt driven by one of said sheaves and further disposed in such manner as to apply a restraining effort on that one of said pulley belts which is associated with that one of the sheaves which is not being positively driven with the pinch roller spindle, whereby in either direction of rotation of the pinch roller, one of said pulley belts can always be driven positively in step with the pinch roller, while the companion pulley belt will not be driven positively by the appertaining drive sheave, and its pulley belt, and said latter belt will have a tensing effort applied thereto by said tensioning member to prevent overrunning or spin-out of the tape reel which is not being positively driven, and effective to maintain a substantially constant tension on the payout web of the tape travelling to the pinch roller.

17. A construction according to claim 16 further characterized in that said clutch springs are each respectively wholly received within the confines of the body of the appertaining sheave and said wafer-like member is disposed between confronting axial faces of the respective sheaves with the said tension elements thereof respectively formed as a tang offset from the plane of said member in a direction opposite from the other and each said tang having a recessed form lying along a line approximately tangential to the run of the pulley belt coming off the sheave on the appertaining side of the wafer-like member and in a position to fit with said pulley belt so as to be thrust against the latter as a result of torque developed in said wafer-like member as the result of drag thereagainst by that one of said sheaves which is being driven substantially as set forth.

18. In a tape reel drive, a reversely-driven shaft, a pair of pulley wheels floating upon the shaft, a one-way clutch drivingly coupling each pulley wheel to the shaft for driving rotation therewith in a direction opposite to the driving rotation of the other pulley wheel, a reel pulley belt driven by each pulley wheel, and automatic reverse-acting tensioning means including a disc disposed on said shaft in between said pulley wheels and in frictional driving contact with both of the latter sufficient to have torque imparted thereto in one or the other of the directions of driving rotation of the pulley wheels, and means moved by said disc responsive to torque imparted thereto as aforesaid to apply tensioning pressure on that one of the belts which is not being positively driven by its appertaining pulley wheel at a time when the other pulley wheel is positively driving the appertaining belt.

19. In a pulley drive system for use with a pair of winding reels each of the reels of which is adapted to operate alternatively with the other as a positively-driven take-up reel while the other operates as a payout reel, drive means comprising a driven shaft, a pair of reversely-acting one-way clutches cooperable with that shaft, a driven pulley wheel cooperable with each clutch to be driven thereby from said shaft in a direction opposite from the driven direction of the other pulley wheel; belt means for each said reel drivingly engaging with one of said driven pulley wheels; and tensioning means frictionally engaging with both driven pulley wheels and adapted to be dragged by that one of said wheels which is being positively clutch-driven at any given time; and belt-engaging means moved by said tensioning means against one or the other of said belt means depending upon the directional effort of drag on said tensioning means whereby to exert a drag effect upon the belt means of that one of the pulley belt means which is not being positively clutch-driven at a given time so that the corresponding reel which is at such time operating as a payout reel is constantly under restraint of such drag effort against running entirely free.

20. Mechanism as set forth in claim 19 further characterized in that said clutches, driven pulley wheels and tensioning means are all cooperatively assembled upon said driven shaft and the tensioning means is disposed thereon in between said wheels.

21. Mechanism as set forth in claim 20 further characterized in that said tensioning means is in the form of a thin disc sandwiched in between said driven pulley wheels in frictional engagement with both of the same upon said shaft, and said belt-engaging means comprises a pair of spaced tangs on said disc respectively positioned each to engage one of said belt means for the purpose and in the manner set forth.

22. In a reel construction for use with sound tape and like web-winding apparatus, a reel having a hub formation including a bore to receive a spindle member concentrically therein for turning with the reel, said hub portion having parts of said bore opening radially sidewise therefrom to expose peripheral portions of said spindle member, and an elongated friction member supported by said reel to extend in the direction of a chord across its circumference adjacent said hub formation with a surface portion frictionally engaging said exposed portions of said spindle member such that the reel and spindle member are yieldingly coupled for joint rotation but the reel or the spindle member may slip one with respect to the other responsive to the action of forces upon said reel and spindle member tending to oppose such joint rotation.

23. In sound tape apparatus, a tape cartridge containing a pair of tape reels, a pinch roller journalled in the cartridge with a peripheral portion of the roller exposed through a side of the cartridge for engagement with a driving spindle, tape from one said reel travelling over said peripheral portion of the roller to the other reel for reverse travel, reel to reel; pulley means floating coaxially about the axis of rotation of the roller and having driving belt connection with each reel for driving one or the other reel positively as a take-up reel; and coupling means assembled with said pulley means and pinch roller and operable reversely to effect a driving connection between said roller, in each of the opposite directions of rotation of the latter, and said driving belt means in a manner to drive only a particular one of said reels in a corresponding direction as a take-up reel, while permitting the other reel to run substantially free of driving effort from the pulley means, as a payout reel in either direction of travel of the tape.

24. In a reverse driving pulley system, the combination, on a shaft of at least two pulleys in closed proximity, belt means driven by each pulley, oppositely-acting unidirectional coupling means drivingly connecting each pulley with the shaft for positive drive in a direction opposite from the driving direction of the other whereby in each driving direction of rotation of the shaft one of said pulleys and the appertaining belt means will be positively driven while the other pulley means will not be positively driven by its appertaining pulley; and reverse-acting automatic tensioning means tending to act always upon the driven belt means and comprising a drag member carried between said pulleys for frictional engagement with both of the same and movable about the axis of said shaft so as to be dragged by that one of the pulleys which is positively driven as aforesaid, and means moved by said drag member in either direction of movement thereof responsive to drag action thereon by a driven one of said pulleys and disposed to bear against that one of the belt means which is not concurrently driven.

25. In sound tape apparatus for use with a driving capstan spindle, a pinch roller assembly including a pinch roller over which tape is travelled between the roller and capstan spindle, tape reels journalled adjacent to pinch roller to serve as payout and take-up reels for the travelled tape, driven reel pulley means for each reel to drive the same individually; said pinch roller assembly including two drive pulleys assembled coaxially with the pinch roller each to be rotated in a different direction codirectionally with the roller when driven by the capstan spindle, and each provided with belt means driving one of said reel pulley means; and means which is part of said pinch roller assembly acting automatically in accordance with the direction of travel of the tape for coupling the pinch roller with that one of said drive pulleys which will drive the reel acting as the take-up reel for the direction of tape travel.

References Cited

UNITED STATES PATENTS

| | | | |
|---|---|---|---|
| 478,147 | 7/1892 | Webb | 242—68.3 |
| 706,113 | 8/1902 | Roebuck et al. | |
| 2,622,812 | 12/1952 | Brastad. | |
| 3,001,025 | 9/1961 | Gaubert. | |
| 3,083,269 | 3/1963 | Gaubert. | |

FOREIGN PATENTS

| | | |
|---|---|---|
| 727,125 | 3/1955 | Great Britain. |
| 800,638 | 8/1958 | Great Britain. |
| 525,979 | 5/1955 | Italy. |
| 598,105 | 9/1959 | Italy. |
| 275,248 | 5/1951 | Switzerland. |

FRANK J. COHEN, *Primary Examiner.*

G. F. MAUTZ, *Assistant Examiner.*